J. A. KNETZER, Sr.
Wagon-Brake.
No. 224,444. Patented Feb. 10, 1880.
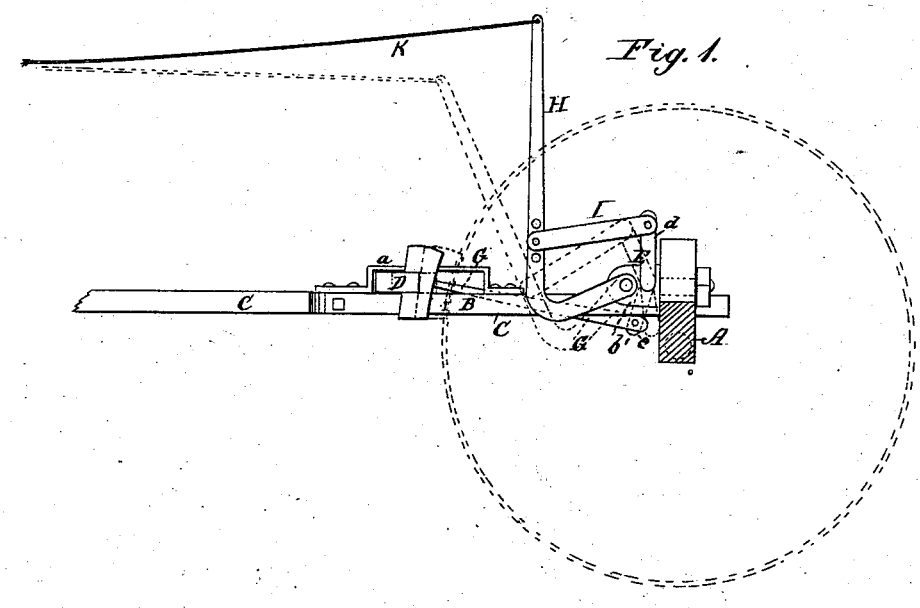
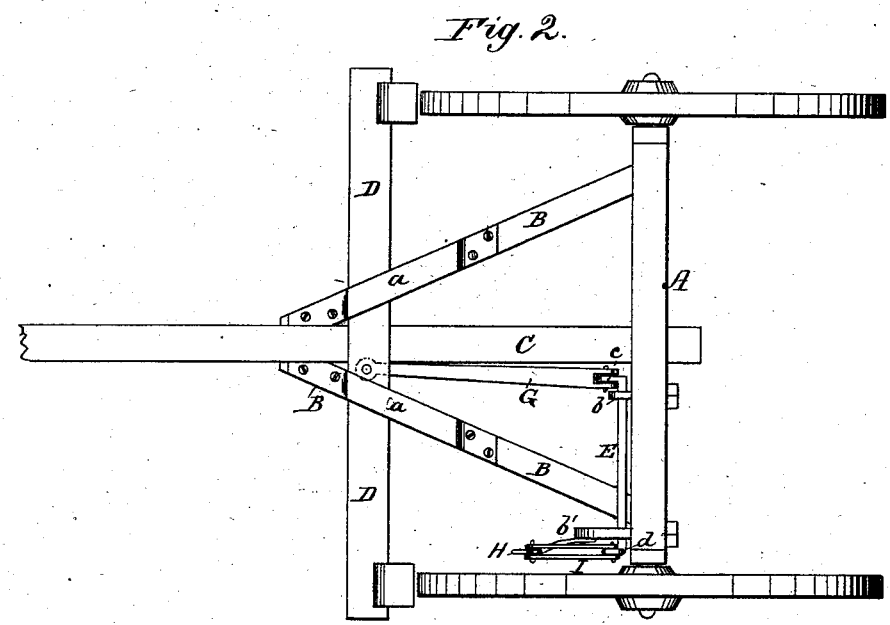
WITNESSES:
W. W. Hollingsworth
Amos W. Hart
INVENTOR:
J. A. Knetzer, Sr.
BY
ATTORNEYS.

UNITED STATES PATENT OFFICE.

JAMES A. KNETZER, SR., OF FILLMORE, INDIANA.

WAGON-BRAKE.

SPECIFICATION forming part of Letters Patent No. 224,444, dated February 10, 1880.

Application filed July 9, 1879.

*To all whom it may concern:*

Be it known that I, JAMES A. KNETZER, Sr., of Fillmore, in the county of Putnam and State of Indiana, have invented a new and Improved Wagon-Brake; and I do hereby declare that the following is a full, clear, and exact description of the same.

My invention is an improvement in the class of wagon-brakes in which the sliding brake-bar is adjusted by a rock-shaft hung on the rear axle and having on its inner end an arm from which a rod extends forward to the brake-bar.

My improvement pertains to the construction of the lever which operates the rock-shaft and the construction and arrangement of the device which connects them, as hereinafter described.

In accompanying drawings, forming part of this specification, Figure 1 is a vertical section of the rear portion of the running-gear of a wagon having my improvement attached. Fig. 2 is a plan view of the same.

My brake is shown attached to the rear axle and hounds, A B, and the perch C. The brake-bar D rests upon the hounds B and perch C, whose upper surfaces are in the same plane, and slides forward and back thereon in the keepers $a$. A rock-shaft, E, is supported by eyes $b$ $b'$, fixed on the rear bolster, and is arranged parallel to the brake-bar D. The inner end of this rock-shaft E is bent downward to form arm $c$, while its outer end is bent upward to form the arm $d$. The inner arm, $c$, is connected with the brake-bar near its middle by means of a pivoted link, G.

It is obvious that (when the parts are in the position shown in full lines) by rotating the rock-shaft E a part of a revolution the brake-bar D will slide backward, thus applying the shoes to the wheels. This operation is effected by a hand-lever, H, whose curved lower end is attached to the eye $b'$ by a detachable bolt.

The lever H is connected with the arm $d$ of rock-shaft E by a slotted or bifurcated link, I, whose attachment to said lever is adjustable to enable the leverage to be changed when desired. A line, K, extends from the upper end of the lever to the driver's seat, (not shown,) for use in applying the brake.

The lever H is bent at a right angle, or nearly so, and is pivoted at the extreme end. This construction and the location of the pivot enable the lever to be thrown down into horizontal position when occasion requires; but it is obviously requisite the link I should first be detached to enable this to be done.

The object in placing the lever horizontal is so that it may be out of the way when loading the wagon with lumber or unloading the same.

What I claim is—

The lever H, having its lower portion bent at a right angle, and pivoted at its end to the frame of the running-gear, and the forked or slotted detachable link I, in combination with the rock-shaft E and sliding brake-bar, all as shown and described.

JAMES ANDREW KNETZER, SR.

Witnesses:
JAMES BONAPARTE ROBINSON,
BRAID DANIEL RICE.